July 28, 1959
B. LIUBAUSKAS
2,896,999
SAFETY DEVICE FOR VEHICLES
Filed Nov. 29, 1955
Fig. 1.
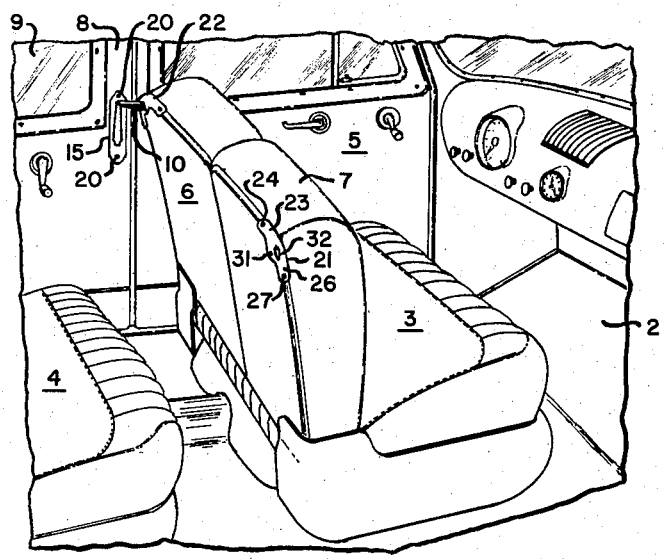
Fig. 2.
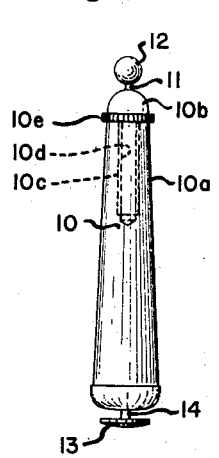
Fig. 3. Fig. 4.
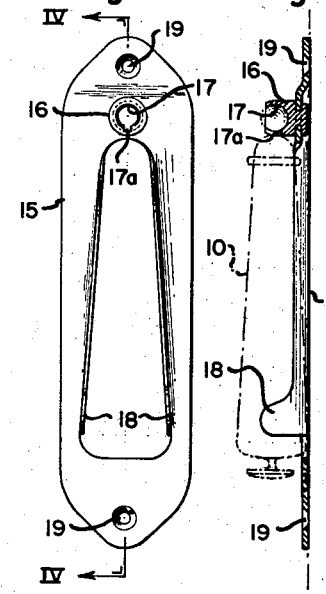
Fig. 6.
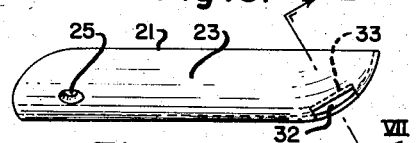
Fig. 5.
Fig. 7.
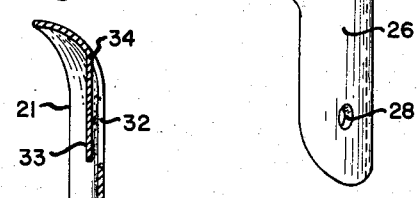
Fig. 8.
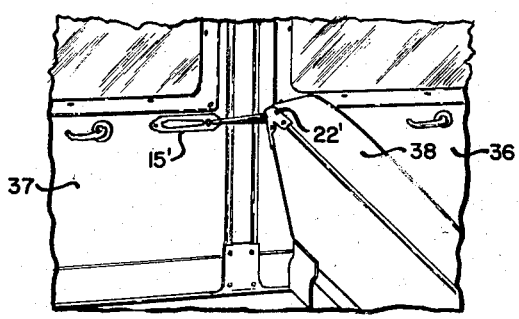
INVENTOR
Boles Liubauskas
his attorneys

# United States Patent Office 2,896,999
Patented July 28, 1959

2,896,999

SAFETY DEVICE FOR VEHICLES

Boles Liubauskas, Du Bois, Pa.

Application November 29, 1955, Serial No. 549,619

1 Claim. (Cl. 296—44)

This invention relates to a safety device for vehicles whose purpose is to promote the safety of passengers in a vehicle in the event of a sudden stop or collision. The device is also of utility in aiding persons in or entering or leaving the vehicle to move about without falling or losing balance.

Broadly the invention has to do with maintaining in predetermined positions movable portions of vehicles. Specifically the invention may be embodied in a device for holding a foldable seat back of the type employed in 2-door passenger automobiles from folding forward in the event of a sudden stop or collision, and it may also be embodied in a device for positively holding a vehicle door closed so that the door will not fly open even if the door latch is rendered inoperative.

I provide, in a vehicle, a body having a generally upright side portion, a seat in the body, one of the generally upright side portion of the body and the seat having a part which is movable to a plurality of positions, and means adapted to be rendered operative and inoperative at will extending when operative between the generally upright side portion of the body and the seat for maintaining said part substantially in predetermined position. Such means may be a latch member connected with one of said part and the one of the generally upright side portion of the body and the seat not having said part and adapted to be latched to the other thereof to maintain said part substantially in predetermined position. The latch member is preferably shaped so as to be adapted to be used as a handle to be grasped by persons in or entering or leaving the vehicle to assist them in moving about.

More specifically, I provide, in a vehicle, a body, a seat having a foldable back in the body and latch means adapted to be rendered operative and inoperative at will extending when operative between the foldable back of the seat and a portion of the body generally at the side of the seat for holding the foldable back of the seat against folding. Such means may be a latch member connected with one of the seat back and a portion of the body generally at the side of the seat back, and a keeper may be provided which is connected with the other thereof and is adapted to receive the latch member to hold the seat back against folding. Preferably the latch member is connected with a generally upright side portion of the body of the vehicle and the keeper is connected with the foldable seat back and adapted to receive the latch member to hold the seat back against folding.

In another aspect the vehicle may comprise a body having a door, a seat in the body and means adapted to be rendered operative and inoperative at will extending when operative between the seat and the door for holding the door closed. Such means may be a latch member connected with one of the door and seat, and a keeper may be provided which is connected with the other thereof and adapted to receive the latch member to hold the door closed. Preferably the latch member is connected with the door and the keeper is connected with the seat.

The latch member preferably has a universal joint mounting. In its preferred form the mounting is a ball and socket mounting. Also I preferably provide a casing receiving the latch member when in inoperative position. The casing preferably has opposed portions cooperatively resiliently holding the latch member in place.

The keeper preferably has a latch member receiving slot tapering to reduced width in a generally downward direction. The latch member receiving slot of the keeper may have therebehind a spring member to resiliently engage the latch member and thereby assist in maintaining it in operative position.

The latch member is preferably extensible and retractable so that differences in the distance between the elements being latched together may be compensated for. For example, the front seat of a 2-door automobile may be adjusted in position forwardly and rearwardly of the automobile so the effective length of the latch member should be variable so that it will perform its function in all adjusted positions of the seat. The latch member may comprise a plurality of portions adapted to assume different relative positions whereby the length of the latch member may be altered.

Other details, objects and advantages of the invention will become apparent as the following description of certain present preferred embodiments thereof proceeds.

In the accompanying drawings I have shown certain present preferred embodiments of the invention in which Figure 1 is a fragmentary perspective view of the interior of a vehicle of the type known as a 2-door sedan automobile;

Figure 2 is a face view of a latch member;

Figure 3 is a face view of a latch member receiving casing;

Figure 4 is a cross-sectional view taken on the line IV—IV of Figure 3 and showing the latch member in outline in chain lines;

Figure 5 is a face view of a keeper;

Figure 6 is a top view of the keeper shown in Figure 5;

Figure 7 is a cross-sectional view through the keeper taken on the line VII—VII of Figure 6; and Figure 8 is a fragmentary perspective view similar to a portion of Figure 1 but showing the interior of a vehicle of the type known as a 4-door sedan automobile.

Referring now more particularly to the drawings, Figure 1 shows fragmentarily and somewhat diagrammatically the interior of a 2-door sedan automobile. Portions of the automobile with which the invention is not concerned are omitted, such, for example, as the steering post and wheel and the operating pedals. The automobile comprises a body designated generally by reference numeral 2 having therein a front seat 3 and a rear seat 4. The body has only two doors, one at each side, the doors being disposed generally in lateral alignment with the front seat 3. One of the doors is shown at 5. The other door is not shown, being directly opposite the door 5 at the opposite side of the front seat 3.

In 2-door sedan automobiles it is customary to divide the back of the front seat into two halves and to make each of the halves or seat backs foldable forwardly generally about the bottom portion thereof to enable the same to be folded down to facilitate movement of persons through the respective doorways to and from the back seat of the automobile. Figure 1 shows two foldable seat backs which are designated, respectively, 6 and 7. They are the same except that the seat back 6 is disposed at the left-hand side of the vehicle and the seat back 7 is disposed at the right-hand side of the vehicle and each seat back is of slightly different shape at its outside portion than at its inside portion. When the front seat is not occupied each of the seat backs 6 and 7 may be folded down substantially against the top of the front seat cushion as is well known.

I provide means for positively holding the foldable seat backs 6 and 7 against folding forward so that in the event of a quick stop or collision there will be less likelihood of injury to persons in the automobile. The body 2 of the automobile has at each side a generally upright side portion 8 which is normally provided with a window 9 so that persons in the back seat 4 may look out. I attach to the generally upright side portion 8 of the body at each side thereof a latch casing and latch member as shown in detail in Figures 2, 3 and 4. The latch member itself is shown in Figure 2 and comprises a body 10 of generally circular cross section shown as increasing somewhat in diameter from one end to the other and provided at the smaller end with a short stem 11 terminating in a ball 12. At the opposite end the latch member has a generally button shaped latching portion 13 connected with the body of the latch member by a short stem 14. The latch member may be made out of any suitable material, preferably steel. The body of the latch member between the stems 11 and 14 may be coated or covered with any suitable material, such, for example, as leather, thereby adapting the latch member to be readily manipulated and also contributing to the utility of the latch member as a handle to be grasped by persons in or entering or leaving the vehicle to assist them in moving about.

The latch member is preferably made extensible and retractable so that differences in the distance between the elements being latched together may be compensated for. The latch member may be made in two parts designated respectively 10a and 10b in Figure 2, the part 10a having an internally threaded bore 10c and the part 10b having an externally threaded stem 10d. A nut 10e is threaded onto the threaded stem 10d and has a knurled outer surface to facilitate its being turned by the fingers. The overall length of the latch member is determined by the extent to which the threaded stem 10d is threaded into the threaded bore 10c. In each adjusted position of the members 10a and 10b relatively to each other the nut 10e is tightened down against the upper end of the portion 10a viewing Figure 2 to lock the portions 10a and 10b relatively to each other in the desired adjusted position. In Figure 2 the latch member is shown adjusted to its shortest possible dimension with the portion 10b flush against the nut 10e.

The latch member is carried by a casing 15. The casing 15 includes a block 16 in which is provided a generally spherical socket 17 which receives the ball 12 of the latch member. At its bottom viewing Figures 3 and 4 the block 16 is provided with a cut out portion 17a communicating with the socket to receive the stem 11 when the latch member is in inoperative position as will presently be described. The casing 15 comprises opposed portions 18 which cooperatively resiliently hold the latch member in place when the latch member is in inoperative position. The casing 15 is provided with screw holes 19 through which it may be fastened by screws 20 to the inside of the portion 8 of the vehicle as shown in Figure 1. The casing 15 carrying the latch member is, when the latch member is employed for latching the foldable front seat backs of a 2-door automobile, installed at any suitable location on the side of the body to cooperate with the keeper presently to be described.

Figures 5, 6 and 7 show a keeper with which the latch member is adapted to cooperate. The keeper is of generally L-shape, and the keeper is made in right- and left-hand forms for application respectively to the upper right-hand and left-hand corners of the back of the front seat of an automobile. The keeper shown in Figures 5, 6 and 7 is designated by reference numeral 21 and is of right-hand form, i.e., it is adapted to be applied to the upper right-hand corner of the back of the front seat of an automobile. The left-hand form is the same except that it is of complemental shape. The keeper of left-hand form is shown at 22 in Figure 1.

The keepers may be made of any suitable material, such, for example, as steel. Stainless steel may be used or the keepers may be made of carbon steel clad or plated with stainless steel. Description of the keeper 21 will suffice for both the right-hand form and the left-hand form since they are the same except for reversal of the arrangement of the parts. The keeper 21 has a generally horizontal upper portion 23 adapted to lie along the top of the rear portion of the right-hand seat back as shown in Figure 1 and to be fastened to the seat back by a screw 24 passing through a screw hole 25. The keeper has a generally downwardly extending portion 26 adapted to lie along the upper rearward corner of the seat back as shown in Figure 1 and to be fastened to the seat back by a screw 27 passing through a screw hole 28. The keeper has a somewhat enlarged central portion 29 joining portions 23 and 26 and provided with a screw hole 30 receiving a screw 31 cooperating with the screws 24 and 27 to firmly fasten the keeper to the seat back. The keeper has a latch member receiving slot 32 which tapers in a generally downward direction substantially to a point as shown in Figure 5. Behind the slot 32 is a spring member 33 to resiliently engage the latch member and thereby assist in maintaining it in operative position. The spring member 33 is preferably integral with the keeper and may be formed of the metal of the keeper stamped out in forming the slot 32 therein, such metal being left integral with the keeper at the upper portion thereof as shown at 34.

The latching portion 13 of the latch member is adapted to enter the upper portion of the slot 32 and to move downwardly in the slot with the latching portion pressed against the spring member 33 and with the stem 14 in the slot. When the latch member is in fully operative position the stem 14 lies in the crotch near the bottom of the slot 32 and positively holds the seat back against folding forwardly. The stem will thus seat in the tapered bottom portion of the slot 32 even after the parts have become worn. The latch member is freely universally movable about its ball and socket connection with the casing 15, being permitted to lie generally within the casing as indicated by chain lines in Figure 4 by reason of the provision of the cut out portion 17a receiving the stem 11 as above explained. When the latch member is moved to inoperative position in the casing 15 the opposed portions 18 of the casing cooperatively resiliently hold the latch member in place. In other words, the casing may be of such size and shape that the latch member when moved to the position shown in chain lines in Figure 4 engages the portions 18 just sufficiently to slightly spring those portions apart so that the latch member is resiliently held in inoperative position.

Figure 8 shows another application of the invention. In that figure there is shown a 4-door sedan automobile having two opposed front doors, one of which is shown at 36, and two opposed rear doors, one of which is shown at 37. The back of the front seat is shown at 38. The seat back 38 may be foldable like the seat backs 6 and 7 if desired although normally the backs of the front seats in 4-door sedan automobiles are made rigid and not foldable. A keeper 22' which may be identical with the keeper 22 is applied to the rearward upper corner of the seat back 38 and a casing 15' with a latch member carried thereby and which may be identical with the casing 15 and the latch member carried thereby are applied to the interior of the door 37 as shown in Figure 8. I have shown the casing and latch member as applied to the body portion 8 in Figure 1 in upright position and as applied to the door 37 in Figure 8 in generally horizontal position, the positioning of the casing and latch member being a matter of convenience depending upon the space available therefor. The latch member of Figure 8 cooperates with the keeper 22' in the same manner as the latch member of Figure 1 cooperates with the keeper 22, the difference in function being that in Figure 8 the latch member holds the door 37 closed whereas in Figure 1 the latch member holds the seat back 6 against folding forward. In each case the latch member is shaped so as to be adapted to be used as a handle to be grasped by persons in or entering or leaving the vehicle to assist them in moving about.

Thus my safety device has a number of advantages and applications and promotes the safety, comfort and welfare of passengers in vehicles of the types described.

While I have shown and described certain present preferred embodiments of the invention it is to be distinctly understood that the invention is not limited thereto but may be otherwise variously embodied within the scope of the following claim.

I claim:

In a vehicle, a body, a seat having a foldable back in the body, latch means adapted to be rendered operative and inoperative at will extending when operative between the upper portion of the foldable back of the seat and a portion of the body generally at the side of the upper portion of the foldable back of the seat for holding the foldable back of the seat against folding and a keeper adapted to receive the latch means when the latch means is operative, the keeper having a latch means receiving slot and a spring member behind the slot to resiliently engage the latch means and thereby assist in maintaining it in operative position.

References Cited in the file of this patent

UNITED STATES PATENTS

| | | |
|---|---|---|
| 1,183,537 | Cole | May 16, 1916 |
| 1,764,487 | Young | June 17, 1930 |
| 1,777,146 | McGlaughlin | Sept. 30, 1930 |
| 1,812,067 | Toncray | June 30, 1931 |
| 2,494,672 | Schofield | Jan. 17, 1950 |
| 2,559,548 | Seigneur | July 3, 1951 |
| 2,624,613 | Parmely | Jan. 6, 1953 |
| 2,670,967 | Kean | Mar. 2, 1954 |

FOREIGN PATENTS

| | | |
|---|---|---|
| 245,837 | Italy | Feb. 1, 1926 |